United States Patent Office 3,285,801
Patented Nov. 15, 1966

3,285,801
LIGNIN CONTAINING RESIN BINDER
Peter T. Sarjeant, Charleston Heights, S.C., assignor to West Virginia Pulp and Paper Company, New York, N.Y., a corporation of Delaware
No Drawing. Filed Nov. 21, 1961, Ser. No. 154,041
9 Claims. (Cl. 161—170)

This invention relates to the manufacture of mineral wool mats and more specifically relates to an improved lignin-urea-phenol aldehyde thermosetting resin for use as a binder for the mineral wool.

The usual raw materials employed in the manufacture of mineral fibers are silica, magnesia, alumina, soda, lime and the like in various combinations with one another and with small amounts of other ingredients. In producing mineral fibers, the mineral is attenuated to a fibrous state while molten. When cooled sufficiently to lose its flowability, the mineral retains its fibrous shape. To prepare mats from these fibers, a resin coating is applied to the fibers which are then felted. The resin is then cured to produce a bond between the fibers at their points of intersection, thus resulting in a tightly bound mass of fibers which find great utility in many areas such as in insulation and filters.

Commercially the manufacture of mineral wool batts is accomplished in a continuous operation wherein the molten mineral is attenuated and passed into a chamber, the attenuated mineral cooled and coated with resin by introducing a spray of aqueous resin mixture into the chamber, and the resin coated fibers are felted on a travelling grate or conveyor which removes the fibers from the chamber and carries them to an oven where the resin is cured. While the basic method for conducting such a process remains the same, widely variant conditions and apparatus may be employed in carrying out the process. For example, attenuation of the molten mineral may be accomplished by passing it through an orifice which revolves rapidly to cause fibrillation by centrifugal action or by passing it through a spinneret in the form of a tiny stream into the path of a blast of hot gas. The basic process and the specific conditions and apparatus which may be employed are in any event old and well known in the prior art and are well shown in such patents as Hadox 2,830,648, Armstrong 2,604,427 and Gorski 2,550,465.

Due to the conditions under which it is employed and the properties desired in the final mineral wool mat, the resin employed for bonding the mineral fibers must meet certain critical requirements. The only resins which have satisfactorily met these requirements have been the alkali catalyzed phenolic resins. These resins, however, are comparatively expensive currently costing about 25 to 30 cents per pound of resin solids. I have now found that a much less expensive resin formulation containing lignin, urea and a phenolic resole can be employed in manufacturing mineral wool batts while obtaining the satisfactory results achieved by the phenolic resoles alone.

Basically, my resin formulation comprises a water solution containing, on a weight solids basis, between 20 and 50 parts phenolic resin, between 28 and 50 parts lignin, and sufficient urea to make 100 parts. It is critical in the above formulation, however, that the amount of urea present equals between 25 and 80% of the weight of the lignin.

It has been found that resins prepared according to this formulation are ideally suited for use as adhesives in the manufacture of mineral wools. These resins are of very low cost with savings up to 50% obtainable as compared to the straight phenolic resins commonly employed in the mineral wool field. They possess excellent stability permitting storage for extended periods of time without refrigeration or undue advancement. The cured resin has good resistance to "punking" due to the high nitrogen content of the urea. Mineral wool mats prepared using the formulation have strengths equal or better than those obtained using commercial phenolic resins and surprisingly, in spite of the large quantity of urea employed in the resin, have very good moisture resistance. In addition, these resins have very excellent curing properties ideally suited for mineral wool manufacture. Unlike ordinary lignin-phenolic resin mixtures which tend to lose their flowability and "precure" while in the blow chamber resulting in poor bonding in the product, these resins do not exhibit this "precure" characteristic.

That this formulation is effective is very surprising since serious problems have in the past been encountered employing lignin and urea individually as extenders for phenolic resins. As mentioned, the primary difficulty encountered using lignin as an extender has been in "precuring" of the resin. While pH adjustment could be employed to reduce this precure characteristic such adjustment greatly decreased the stability of the resin and prevented the resin solution from being diluted to low concentrations without precipitation of the lignin.

Urea, on the other hand, is well known for its characteristic of severely reducing the moisture resistance of resins in which it is employed. Urea containing resins also age poorly becoming very brittle over extended periods of time. Primarily though, the use of urea in the manufacture of mineral wool according to the methods described above has been discarded due to the breakdown of the urea under the temperature conditions employed in the blow chamber and curing oven with the production of formaldehyde, biuret, and ammonia. Not only are these materials highly obnoxious requiring extensive ventilating equipment to remove them, but such loss of urea greatly reduces the efficiency of the resin, i.e., the amount of resin actually cured on the mineral fibers expressed as percentage of the resin sprayed onto the fibers in the blow chamber.

However, in the above formulation, the use of lignin and urea in joint use with one another within the proportions stated results in the elimination of the detrimental characteristics of the individual components.

The following examples illustrate methods of preparing lignin-urea-phenolic resins according to the present invention.

*Example I*

64 pounds of U.S.P. phenol (92%) and 38.1 pounds of paraformaldehyde (91%) were charged into a reaction vessel together with 9 pounds of water. The temperature of this mixture was raised to 162° F., when the first of nine catalyst additions were made. Further additions were made according to the following cooking schedule.

| Time, minutes | Catalyst added, lbs. 50% NaOH solution | Temp., ° F. |
|---|---|---|
| 0 | 0.14 | 162 |
| 10 | 0.14 | 156 |
| 20 | 0.14 | 160 |
| 30 | 0.14 | 162 |
| 35 | 0.14 | 162 |
| 40 | 0.14 | 162 |
| 45 | 0.28 | 162 |
| 50 | 0.28 | 162 |
| 55 | 0.56 | 162 |
| Total | 1.96 | |

After the final addition of catalyst, the 160-2° F. temperature was maintained for an additionl 35 minutes after which the resin solution was rapidly cooled to room temperature. This resin had the following properties:

pH _____ 8.6
Solids content, percent _____ 62.5
Water dilutability _____ Infinite
Free formaldehyde, percent of total solution ___ 4.1

321 parts by weight of the above phenolic resin were diluted with 215 parts by weight of water. 35.7 parts of 28% ammonia solution were then added to the dilute resin solution to eliminate the free formaldehyde by converting it to hexamethylene tetramine. 256.4 parts by weight of a free acid kraft pine lignin were added to the resin solution followed by the addition of 176.2 parts of prilled urea. Both the lignin and urea dissolved rapidly to produce a smooth solution. 78.6 parts of a 19.2% hexamethylene tetramine solution and 57.6 parts of methanol were finally added to produce the final resin solution. The properties of this resin solution were as follows:

pH _____ 8.85
Solids content, percent _____ 56.5
Water dilutability _____ Infinite This resin solution when diluted to an appropriate solids concentration was employed in making rock wool batts in commercial equipment. The quality of the batts produced were equal or better than the normal production made in the same equipment using a commercial phenolic resin designed for use in making mineral wools.

*Example II*

684 parts by weight of 92% U.S.P. phenol and 1000 parts of 44% formaledhyde solution were charged into a reaction vessel and heated to 160° F. Incremental catalyst addition during cooking was made according to the following schedule.

| Time, minutes | Catalyst added, parts by weight of 50% NaOH | Temp., °F. |
| --- | --- | --- |
| 0 | 1.5 | 160 |
| 10 | 1.5 | 158 |
| 20 | 1.5 | 159 |
| 30 | 1.5 | 160 |
| 35 | 1.5 | 161 |
| 40 | 1.5 | 162 |
| 45 | 3.0 | 161 |
| 50 | 3.0 | 162 |
| 55 | 6.4 | 162 |
| Total | 21.4 | |

The temperature of the mixture was maintained for an additional 55 minutes at 160–162° F. At the end of this time the resin mixture was rapidly cooled. The properties of the resin were as follows:

pH _____ 8.6
Solids content, percent _____ 48.8
Dilutability _____ Infinite
Free formaldehyde, percent _____ 6.6

160 parts of 28% aqueous ammonia solution were added to the resin solution causing an exotherm which raised the temperature to 112° F. After cooling, 6480 parts of a lignin-urea solution were added to the resin solution (1865 parts). The lignin-urea solution was prepared by adding 780 parts of urea and 165 parts of 28% aqueous ammonia to a water slurry of 1160 parts of free acid kraft pine lignin in 4375 parts of water. The properties of this final resin solution were as follows:

pH _____ 8.5.
Solids content _____ 34%.
Dilutability _____ Infinite.
Stability (75° F.) _____ Greater than 21 days at any dilution level.

This resin when employed in the manufacture of rock wool was somewhat superior to that of Example I due to improved resin efficiency, i.e., decreased loss of resin due to volatilization, breakdown, etc., in the manufacturing operation.

While a wide range of alkaline catalyzed phenolic resins may be employed in my formulation, these resins to acheive the desired results must have certain characteristics. The resins must be water soluble and water dilutable to low solids contents, i.e., to solids contents of about 2%. To obtain this necessary water solubility and dilutability, formation of polymeric materials during cooking should be avoided, with substantially all the resin being in the form of monomeric phenolic alcohols. Methods of accomplishing this are well known to those skilled in resin making.

While obtaining the necessary water solubility and dilutability characterstics, it is necessary that a relatively high methylol substitution be achieved in order to provide sufficient reactive groups for proper curing with the lignin and urea. It has been determined that between about 1.3 and 2.0 methylol groups should be present per phenolic molecule to achieve this result. In order to obtain this degree of substitution without causing polymerization, an excess of formaldehyde must be employed in cooking. A generally desirable range of phenol/formaldehyde ratios has been found to be between about 1/1.7 to 1/2.5 with a ratio of about 1/2.2 being preferred. By employing reactant ratios within this range, resins with proper water solubility and functionality can be easily obtained by cooking until the free formaldehyde content has been reduced to between 3.5 and 7.5 percent. At free formaldehyde contents higher than 7.5%, waste of reactant occurs with reduced functionality in the resin. At free formaldehyde contents below 3.5%, polymerization of the monomeric resin materials becomes excessive resulting in decreased water solubility characteristics. It should be noted that as used herein the free formaldehyde content is the qantity of unreacted formaldehyde expressed as a percentage of the total resin solution.

The catalyst for preparing the resin may be selected from any alkaline water soluble alkali metal or alkali earth compound. Such materials as sodium hydroxide, sodium carbonate, sodium sulfite, calcium hydroxide, and barium hydroxide may all be satisfactorily employed. Ammonia and other nitrogen containing bases should not be employed as catalysts as resins prepared with them have greatly reduced solubility and stability characteristics, particularly in the presence of lignin. The quantity of catalyst employed should in general be limited to 0.1 mole per mole of phenol to avoid excessive polymeric formation.

While it is necessary to have, as has been indicated, free formaldehyde present in the resin solution at the end of the cook, such free formaldehyde has a very deleterious effect on the stability and precure characteristics when present in my formulation with the lignin and urea. Consequently, the free formaldehyde must be substantially removed from the resin to prevent premature reaction with these components. This may most easily be accomplished by adding sufficient ammonia to the phenolic resin solution to tie up the formaldehyde in the form of hexamethylene tetramine. This "hexa" has no deleterious effect and in fact is somewhat beneficial since the formaldehyde therein becomes available for reaction during curing of the formulation in the curing ovens.

Any of the alkali lignins may be employed in my formulation. These lignins are all derived by an alkaline digestion of lignocellulose material. Most commonly they are obtained as by-products from alkaline processes of paper making where sodium hydroxide alone or in combination with sodium sulfide is employed. These lignins are generally referred to as soda and kraft or sulfate lignins after the pulping process used. Such alkali lignins should be employed in my formulation in the free acid form, i.e., that form where the water solubilizing alkali cations have been replaced by hydrogen through acidification. The alkali salt form of lignin contains large quantities of alkali metal which has a deleterious effect on the mineral fibers and should not be used. The free acid lignin is not soluble in water, however, it is soluble even at dilute concentrations in mutual phenolic resin-urea water solutions. Where it is desired to pre-mix the lignin and urea in solution prior to admixture to the phenolic resin, ammonia should be employed to solubilize the lignin.

In the preferred practice of this invention, the alkali lignin employed is a kraft pine lignin. Other alkali lignins such as soda pine and hardwood and kraft hardwood require a somewhat higher pH to attain good water dilutability. This higher pH in turn tends to reduce the stability of the formulation.

It is of great importance that the ingredients be employed in correct proportions in the preparation of my formulation. For example, where less than 20% phenolic resin is employed, it has been found that sufficient methylol groups are not present in the reaction mixture to obtain high strength bonds. Where above 50% phenolic resin is employed, the stabilty of the resin is impaired. In like manner, the presence of more than 50% lignin causes problems of stability and dilutability. Since a maximum of 50% phenolic resin can be employed, the minimum quantity of lignin which can be used is about 28%. This is necessitated by the fact that the urea should not be in excess of 80% of the lignin to achieve proper balance of these two materials to obtain proper curing.

In preferred practice of this invention about 30 to 40 parts of phenolic resin and 35 to 45 parts of lignin should be employed. The urea in this preferred formulation should constitute about 55 to 70% of the weight of the lignin. Within this preferred range an excellent balance of the components is obtained yielding a resin possessing all the desired properties for use in the binding of mineral wools.

Various antioxidizing additives, such as phosphates, borates, antimonates, etc., for use where exceptional fire resistance is required may be employed with my formulation without difficulty. Hexamethylene tetramine may also be employed to plasticize and provide additional reactants during curing. As some hexamethylene tetramine is necessarily present due to the reaction of the free formaldehyde with ammonia after resin formation, additional amounts will not be generally needed or desirable except where the phenolic resin has a low methylol substitution, i.e., 1.3 to 1.6 methylols per mole of phenol. Addition of other reactants is, in general, undesirable due to their possible unbalancing of the components in my formulation.

The pH of water solutions of my resin formulation should be maintained above 7.7 to achieve proper stability and curing. pH's above about 10 tend to promote precure in the blow chamber and consequently are not desirable. Generally, the admixture of the components will yield solutions in this pH range, however, where adjustment is necessary, it can be made by the addition of small quantities of an alkaline material, preferably ammonia.

The customary practices employed in manufacturing mineral wool mats using straight phenolic resins may in general be used with my formulation. One possible exception to this is that my formulation is somewhat more heat sensitive during curing due to the quantity of urea present. Consequently, it is highly desirable in order to obtain a high resin efficiency to maintain the temperature in the curing oven at the low end of the customary range of 400 to 700° F. Preferably curing should be accomplished at 400 to 550° F.

The resins employed in manufacturing mineral wool batts are generally sprayed into the chamber at a solids concentration of between about 2 and 25%. The practice usually varies with the type of mineral fiber, with 5 to 25% solids being generally employed for rock wool and 4 to 10% solids being generally employed for glass wool. In common practice about 1 to 25 parts of resin solids are applied to 100 parts of mineral fiber. This practice also varies with the type of mineral wool with about 1½ to 8 parts being used in rock wool and 12 to 25 parts being used in glass wool. These customary practices are well suited for use with my formulation in the production of high quality mineral fiber mats.

I claim:
1. A resin binder whose reactive components consists essentially of from 20 to 50 parts by weight of a water soluble alkaline catalyzed phenol formaldehyde resin, 28 to 50 parts by weight of alkali lignin, and sufficient unreacted urea to make 100 parts, said urea being phesent in an amount equal to between 25 and 80% of the weight of the lignin.

2. The resinous binder of claim 1 containing 30 to 40 parts of phenol formaldehyde resin, 35 to 45 parts of lignin and sufficient urea equal to 55 to 70% of the weight of the lignin to make 100 parts.

3. An aqueous resin binder solution having a pH of above 7.7 whose reactive components consist essentially of from 20 to 50 parts by weight of a water soluble alkaline catalyzed phenol-formaldehyde resin, 28 to 50 parts of alkali lignin and a quantity of urea equal to between 25 and 80% of the alkali lignin to make 100 parts, said solution being substantially free of unreacted formaldehyde and being dilutable to solids concentrations between 2 and 60% without precipitation of said reactive components.

4. The resinous binder solution of claim 3 wherein the lignin is a kraft pine lignin.

5. The resinous binder solution of claim 4 containing 30 to 40 parts of phenol formaldehyde resin, 35 to 45 parts of lignin and sufficient urea equal to 55 to 70% of the lignin to make 100 parts.

6. The method of producing mineral fiber mats which comprises attenuating molten mineral in a chamber to form fibers, spraying into said chamber an aqueous resin solution whose reactive components consist essentially of 20 to 50 parts by weight of a water soluble alkaline catalyzed phenol formaldehyde resin, 28 to 50 parts by weight of alkali lignin, and a quantity of unreacted urea equal to between 25 and 80% of the weight of the lignin to form a resinous deposit on said mineral fibers, felting said fibers after deposition of the resin thereon, and heat curing the resin to bind the fibers together at their points of intersection.

7. The method of claim 5 wherein the heat curing of the resin is accomplished at a temperature between 400 and 550° F.

8. The method of producing mineral fiber mats which comprises attenuating molten mineral in a chamber to form fibers, spraying into said chamber and onto said fibers an aqueous resin solution having a solids content between about 2 and 25 percent, equal to about 1 to 25 percent of the weight of the fibers, the reactive components of said resin solution consisting essentially of from 20 to 50 parts of a water soluble alkaline catalyzed phenol formaldehyde resin, 28 to 50 parts of an alkali lignin and sufficient unreacted urea equal to 25 to 80% of the weight of the lignin to make 100 parts, the spraying of said resin solution into said chamber cooling said mineral fibers, causing evaporation of water from the aqueous resin solution and depositing a resinous residue on the fibers, felting said fibers after deposition of the resin thereon, and heat curing the resinous residue to bind the fibers together at their points of intersection.

9. A mat of mineral fibers comprising a plurality of mineral fibers bound together at their points of contact with a heat cured thermoset resin which consists essentially of the product of the reaction of between 20 and 50 parts of an alkaline catalyzed phenol formaldehyde resin, 28 to 50 parts alkali lignin and sufficient urea equal to between 25 and 80% of the lignin to make 100 parts.

References Cited by the Examiner

UNITED STATES PATENTS

| | | | |
|---|---|---|---|
| 2,604,427 | 7/1952 | Armstrong et al. | 156—26 |
| 2,664,377 | 12/1953 | Van Beckum et al. | 260—17.5 |
| 2,751,650 | 6/1956 | Froberger | 260—17.5 |
| 2,845,397 | 7/1958 | Mills | 260—17.5 |

ALEXANDER WYMAN, *Primary Examiner.*

EARL M. BERGERT, *Examiner.*

R. J. ROCHE, *Assistant Examiner.*